United States Patent
Kumar et al.

(10) Patent No.: US 9,256,714 B2
(45) Date of Patent: Feb. 9, 2016

(54) PRESERVING INTEGRITY OF MESSAGES IN A MESSAGING ORIENTED MIDDLEWARE SYSTEM

(75) Inventors: Darbha V. Kumar, Bangalore (IN); Andrew J. Stanford-Clark, Chale (GB); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 13/292,797

(22) Filed: Nov. 9, 2011

(65) Prior Publication Data

US 2013/0117401 A1     May 9, 2013

(51) Int. Cl.
| | |
|---|---|
| G06F 15/16 | (2006.01) |
| G06F 21/00 | (2013.01) |
| H04L 12/00 | (2006.01) |
| H04L 29/00 | (2006.01) |
| H04L 29/06 | (2006.01) |
| H04L 12/58 | (2006.01) |

(52) U.S. Cl.
CPC ............... *G06F 21/00* (2013.01); *H04L 12/00* (2013.01); *H04L 29/00* (2013.01); *H04L 51/22* (2013.01); *H04L 63/12* (2013.01); *H04L 63/20* (2013.01)

(58) Field of Classification Search
CPC ......... H04L 63/10; H04L 12/00; H04L 29/00; H04L 63/12; H04L 63/20; H04L 51/22; G06F 21/00
USPC .......................................................... 709/207
See application file for complete search history.

(56) References Cited

U.S. PATENT DOCUMENTS

| | | | |
|---|---|---|---|
| 6,732,101 B1 | 5/2004 | Cook | |
| 7,640,427 B2* | 12/2009 | Callas et al. | ................... 713/153 |
| 7,962,582 B2 | 6/2011 | Potti et al. | |
| 8,701,156 B1* | 4/2014 | Agrawal | ........................... 726/1 |
| 2003/0120924 A1* | 6/2003 | Immonen | ..................... 713/170 |
| 2004/0148191 A1* | 7/2004 | Hoke, Jr. | ........................... 705/1 |
| 2005/0267947 A1* | 12/2005 | Patrick et al. | ................. 709/217 |
| 2006/0064750 A1* | 3/2006 | Kersey et al. | .................... 726/14 |
| 2006/0064751 A1* | 3/2006 | Ahuja et al. | ..................... 726/14 |
| 2007/0019670 A1* | 1/2007 | Falardeau | ..................... 370/465 |
| 2007/0038569 A1* | 2/2007 | Hickson | .......................... 705/50 |
| 2008/0010448 A1* | 1/2008 | Sabnis et al. | .................. 713/156 |
| 2009/0150675 A1* | 6/2009 | Cook | ............................ 713/175 |
| 2010/0229024 A1* | 9/2010 | Hawkins et al. | .................. 714/2 |

(Continued)

OTHER PUBLICATIONS

IBM Corporation, "Message Flow Security Overview", Websphere Message Broker Version 7.0.0.3, http://publib.boulder.ibm.com/infocenter/wmbhelp/v7r0m0/index.jsp?topic=%2Fcom.ibm.etools.mft.doc%2Fap04090__.htm, Last Updated May 19, 2011.

(Continued)

*Primary Examiner* — June Sison
*Assistant Examiner* — Steven Nguyen
(74) *Attorney, Agent, or Firm* — Alan Bruce Clay

(57) ABSTRACT

Message integrity in a messaging oriented middleware system is preserved by determining a message producer's level of message integrity by examination of connection details between the message producer and a messaging engine. The message producer's level of integrity is stored in a memory of the messaging engine. The message is then stored in the designated destination using the message producer's level of integrity. The message is sent from the designated destination to a consumer when it is determined that the consumer conforms to the integrity levels.

17 Claims, 5 Drawing Sheets

(56) References Cited

U.S. PATENT DOCUMENTS

| | | | |
|---|---|---|---|
| 2011/0051606 A1* | 3/2011 | Cutlip et al. | 370/252 |
| 2011/0125855 A1* | 5/2011 | Hartwich et al. | 709/206 |
| 2011/0125921 A1 | 5/2011 | Karenos et al. | |

OTHER PUBLICATIONS

IBM Corporation, "Identity", Websphere Message Broker Version 7.0.0.3, http://publib.boulder.ibm.com/infocenter/wmbhelp/v7r0m0/index.jsp?topic=%2Fcom.ibm.etools.mft.doc%2Fap04010__.htm, Last Updated May 19, 2011.

* cited by examiner

PRESERVING INTEGRITY OF MESSAGES IN A MESSAGING ORIENTED MIDDLEWARE SYSTEM

BACKGROUND

The present invention relates, in general, to messaging, and, in particular, to preserving the integrity of messages in a messaging middleware system.

In the growing market space of cloud, platform as a service (PaaS), messaging as a service (MaaS), and software as a service (SaaS), preserving the integrity of the messages from production to consumption becomes crucial. Enabling messaging as a service means that applications wanting to produce and consume messages will have no knowledge of the underlying messaging infrastructure (since it is transparent to end applications).

Transactions and Security are two important requirements to maintain the integrity of messages being exchanged between Producers and Consumers. With the asynchronous nature of messaging, a significant loophole appears in the messaging middleware where both the transaction and security of messages are ignored. The importance or business criticality of a message is always best determined by the Producer. It is the Producer who knows the value of the message being sent to the middleware with anticipation that the same integrity is maintained until the Consumer receives it.

BRIEF SUMMARY

According to one embodiment of the present invention, a method preserves the integrity of messages in a messaging oriented middleware system by determining a message producer's level of message integrity by examination of connection details between the message producer and a messaging engine. The message producer's level of integrity is stored in a memory of the messaging engine. The message is then stored at the messaging engine in a designated destination using the message producer's level of integrity. The message is then sent from the designated destination to a consumer when it is determined that the consumer conforms to the integrity level.

According to one embodiment of the present invention, a computer program product preserves the integrity of messages in a messaging oriented middleware system. The computer program product comprises a computer readable storage medium having computer readable program code embodied therewith. The computer readable program code comprises code configured to determine a message producer's level of message integrity by examination of connection details between the message producer and a messaging engine. The computer readable program code is configured to store the message producer's level of integrity in a memory of the messaging engine. The computer readable program code is configured to store the message at the messaging engine in a designated destination using the message producer's level of integrity. The computer readable program code is configured to send the message from the designated destination to a consumer when it is determined that the consumer conforms to the integrity level.

According to one embodiment of the present invention, a system preserves the integrity of messages in a messaging oriented middleware system. The system comprises a processor and a memory connected to the processor. The memory is encoded with instructions that, when executed, determine a message producer's level of message integrity by examination of connection details between the message producer and a messaging engine. The encoded instructions store the message producer's level of integrity in a memory of the messaging engine. The encoded instructions store the message at the messaging engine in a designated destination using the message producer's level of integrity. The encoded instructions send the message from the designated destination to a consumer when it is determined that the consumer conforms to the integrity level.

DETAILED DESCRIPTION

Figure 1:
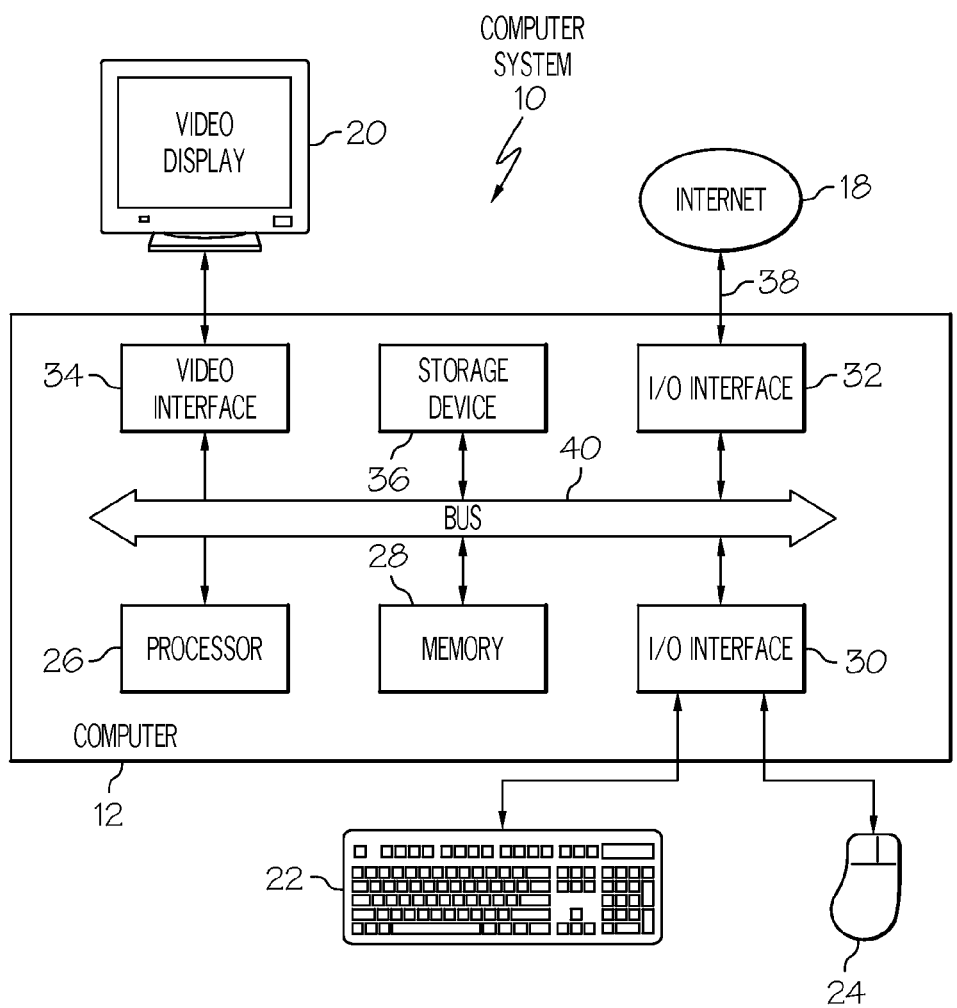
FIG. 1 is an illustration of hardware upon which an embodiment of the present invention may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media (memory or device) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is one example of a computer system 10 suitable for executing computer software for preserving the integrity of messages in a messaging oriented middleware system. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

The present invention provides advantages over the prior art by ensuring a Messaging Engine determines the integrity of a message based on the Producer needs and delivers such messages only to those Consumers who conform to the definition of the integrity of the message as defined by the Producer. Neither the Producer nor the Consumer has to set any message properties on the messages. The same integrity is maintained all through the messaging engines network (i.e., hopping of messages through multiple ME's before getting delivered to the Consumers). The present invention ensures the messages are delivered only to those Consumers who conform to the integrity rules as expected by the Producers for individual messages.

As an example, one embodiment of the present invention may be linked to a postal service scenario. The sender of a communication decides what type of postal cover to use based on the importance of the information he/she is exchanging with the recipient. Some use an open post card. Some use a sealed envelope. Some use a courier service, and so on. If a bank is sending a credit card or a pin-number to a customer, they may choose the highest level of security available to send the credit card, such as a private courier service, unopened, with a mandate to deliver only to the named addressee. The postal service can be equated to an asynchronous middleware service and how that service should work, i.e., to route mail, but adhere to the rules and integrity set by the Producer/sender until the mail is delivered to the Consumer.

In a messaging middleware service, the Producer determines how much security is required to secure the integrity of a message with the expectation that the messaging middleware will ensure the same level of integrity is maintained until the Consumer receives it. However, the integrity of a message is only maintained between "Producer and Messaging Engine" (ME) and "Messaging Engine and Consumer," while the integrity of messages between "Producers—Messaging Engine—Consumers" is not maintained. Thus, the security desires of the sender may not be honored by the ME as the integrity of the message may not be maintained.

As used herein, integrity is defined as honoring the message Producer's desire for transaction and/or security requirements. For example, transaction integrity will ensure a transaction reaches its intended Destination and Consumer without impairment of its function, content or meaning A transacted message is a single unit of work, wherein, the message is either committed on success or is rolled back if a failure occurs.

Similarly, if a message Producer requires security integrity via Secure Sockets Layer (SSL), a given Destination may have a Consumer using SSL and another Consumer not using SSL. Therefore, security integrity requires that the message is only delivered to the Consumer catering to the security requirements through which the message was produced (SSL).

A messaging engine (ME) is the physical runtime object that manages application connections and the runtime state of a bus and its Destinations. An ME manages the states of application connections and runs inside a server or cluster bus member and manages the states of the Destinations assigned to the bus member. A messaging engine maintains runtime state including messages and transactions.

In one embodiment of the present invention an ME determines the integrity of a message based on the Producer needs and delivers such messages only to those Consumers who conform to the definition of the integrity of the message as defined by the Producer. Neither the Producer nor the Consumer need set any message properties on the messages. The same integrity is maintained all through the ME network (i.e., hopping of messages through multiple ME's before getting delivered to the Consumers). The present invention ensures the messages are delivered only to those Consumers who conform to the integrity rules as expected by the Producers for individual messages.

As used herein, there are four different states of integrity of messages:

a) Messages sent with BOTH transaction and security enabled:
   In this situation the Producer application chooses to send a message within both transaction and secured scope (i.e., SSL). In such situations, the ME must and should deliver the message to a Consumer who connects to the ME wanting to pull a message within a transaction and secured scope. Consumers who connect without any transaction and secured scope must not get this message b) Messages sent with ONLY transaction enabled but security disabled:
   In this situation the Producer application chooses to send a message within a transaction but not using any SSL. In such situations, the ME must and should deliver the message to a Consumer who connects to the ME wanting to pull a message in a transaction. Consumers who connect without any transaction scope must not get this message.

c) Messages sent with ONLY security enabled but transaction disabled:
   In this situation the Producer application chooses to send a message within security scope but not using any transactions. In such situations, the ME must and should deliver the message to a Consumer who connects to the ME wanting to pull a message within the secured access. Consumers who connect without any security (SSL) scope must not get this message.

d) Messages sent with both transaction and security disabled:
   In this situation the Producer application chooses not to use any sort of message integrity and is fine with any Consumer consuming the message in whatever mode the Consumer wants.

One embodiment of the present invention comprises four phases:

1) Phase 1:
   This phase deals with the administrative task of creating a Destination to support end-to-end transactional and security integrity for a message. This phase determines if the ME should enforce strict message integrity checks from the Producer to the Consumer(s), and also ensures the ME creates different logical partitions for the same Destination;

2) Phase 2:
   In this phase, the Producer's credentials are validated during "connect" time. The ME validates the Producer's state as to whether it is connecting using SSL, Transaction, both, or neither. Once the ME validates the Producer's credentials, it stores the state of the Producer in its memory. Any further messages that are sent by this Producer will have the same credentials.

3) Phase 3:
   In this phase, the message Producer "sends" the message and the ME validates it against the Producer's credentials that the ME has stored. If there is a message sent by the Producer and the Destination is not enabled to store such messages, then the message is sent to an exception Destination and the Producer is notified that the message has not been accepted with an error message.

4) Phase 4:
A Consumer connects to the ME to receive the message and the ME validates the integrity of the message before delivery.

Figure 2:
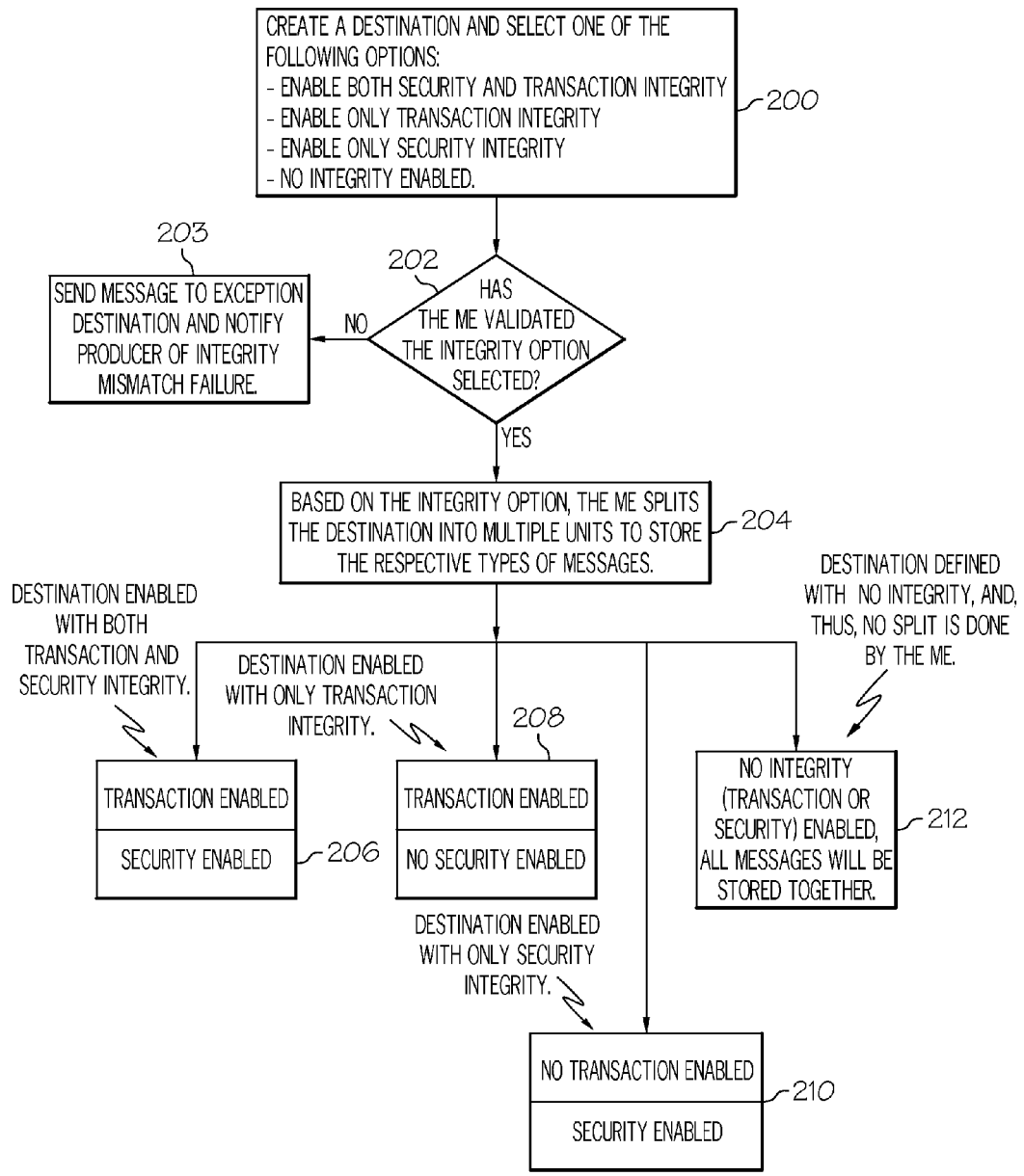
FIG. 2 illustrates phase one of an embodiment of the present invention.

Referring to FIG. 2, phase 1 of one embodiment of the present invention is described in greater detail. A Destination is enabled to support end-to-end transaction and security integrity for a message. This phase begins at block 200 with the administrative task of creating a logical partition of a Destination to store messages that fall into one of the four states with attributes determining whether the ME should enforce a strict message integrity check from the Producer to the Consumer(s). One of the four different states a particular Producer can choose to send a message to a messaging engine is selected:

1) The message is sent in a transacted session and SSL layer;
2) The message is sent in a transacted session but non-SSL layer;
3) The message is sent in a non-transacted session but in an SSL layer; or
4) The message is sent in non-transacted session and non-SSL layer.

At decision block 202, the messaging engine validates the integrity state/option. The user will be able to choose what sort of message integrity a particular Destination can hold. At this stage the ME validates whether the message integrity matches the integrity settings on the chosen Destination. If not, at block 203, the ME sends the message to an "exception Destination" and notifies the Producer application of the integrity mismatch failure. For instance, if the message Producer tries to send a message with Security enabled (SSL) to a Destination that is tailored to accept only messages with transactional context, the ME validation will fail and the producer is notified of this failure.

If the message integrity is validated, based on the integrity option, the ME splits the Destination into multiple units to store the respective types of messages at block 204. The Destination can be set to store messages with different integrity options, both security and transaction at block 206, transaction only at block 208, security only at block 210, or neither transaction or security at block 212. Based on the type of integrity and Destination settings, the ME creates a logical partition to store the message and also to directly retrieve it for a Consumer who satisfies the integrity criteria. The process then proceeds to phase 2, as shown in FIG. 3.

Figure 3:
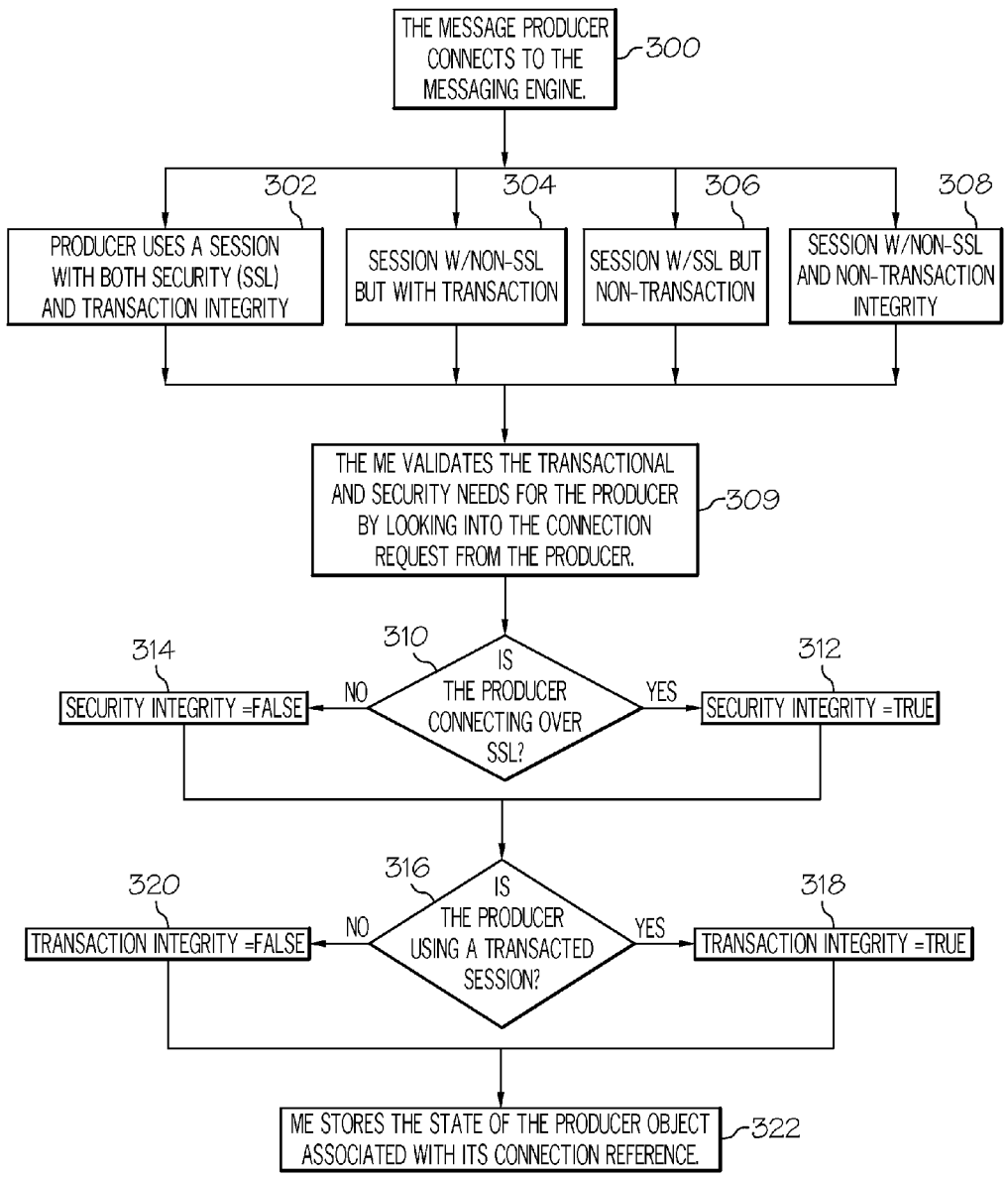
FIG. 3 illustrates phase two of an embodiment of the present invention.

Referring to FIG. 3, the second phase is illustrated in which the Producer's credentials are validated during "connect" time. The Producer sends different messages with different integrity. At block 300, the message Producer connects to the ME. At block 302, the Producer uses a session with both security (SSL) and transaction integrity. At block 304, the Producer uses a session with non-SSL but does use transaction integrity. At block 306, the Producer uses a session with SSL but not transaction integrity. At block 308, the Producer uses a session with non-SSL and non-transaction integrity. After block 302, 304, 306, or 308, the ME validates the transactional and security needs for the Producer by looking into the connection request from the Producer at block 309. This is verified by the nature of a connection request that the Producer application has made. It can be a connection with SSL enabled, in which case the ME treats it as "Security required," or it can be a connection request with transactional context, in which case the ME treats it as "Transaction required," etc.

It is then determined at decision block 310 whether the message Producer is connecting over a secure (SSL) communication channel. If it is determined at decision block 310 that the connection is over SSL, the ME uses a Security Integrity flag to note the integrity need at block 312. For example, a Boolean flag may be used where flag=true means Security integrity is required. If it is determined at decision block 310 that the connection is not over SSL, the ME uses a Security Integrity flag to note no integrity needed at block 314. For example, a Boolean flag may be used where flag=false means security integrity is not required.

After block 312 or 314, it is determined at decision block 316 whether the message Producer is using a transacted session. If it is determined at decision block 316 that the session is transacted, the ME uses a Transaction Integrity flag to note the integrity need at block 318. For example, a Boolean flag may be used where flag=true means Transaction integrity is required. If it is determined at decision block 316 that the session is not transacted, the ME uses a Transaction Integrity flag to note the non-integrity need at block 320. For example, a Boolean flag may be used where flag=false means Transaction integrity is not required.

Subsequent to block 318 or block 320, the ME stores the state of the Producer object (message) associated with its connection reference, as determined above, at block 322. Specifically, the state is Security Integrity True or False and/or Transaction Integrity True or False. These conditions equate to the four different states in which a particular Producer can choose to send a message to a messaging engine, as previously defined. The process then proceeds to phase 3, as shown in FIG. 4.

Figure 4:
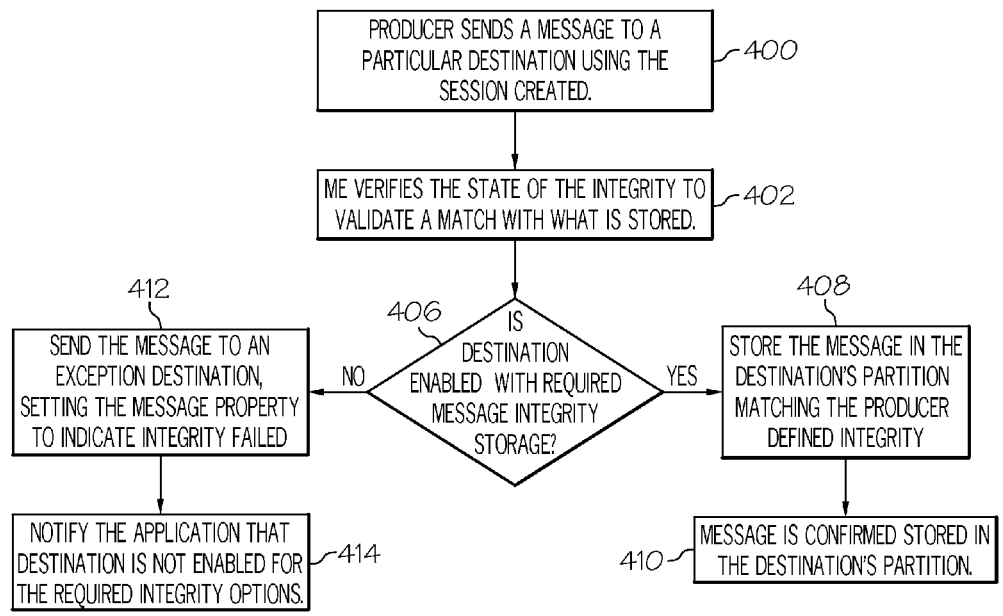
FIG. 4 illustrates phase three of an embodiment of the present invention.

Referring to FIG. 4, the third phase is illustrated in which the Producer "sends" the message and the ME validates it against the Producer's credentials that the ME has stored. If there is a different message sent by the Producer and the Destination (an anonymous name used for a Queue or a TopicSpace) is not enabled to store such messages, then the message is sent to an exception Destination and an error is notified that the message has not been accepted. At block 400 the message is sent to a particular Destination using the session created in phase 2. At block 402, the ME verifies the state of the integrity to validate a match with what is stored in the Security and Transaction Integrity flags, discussed above with reference to FIG. 3.

At decision block 406, it is determined whether the Destination is enabled with the required message integrity storage. If the response to decision block 406 is yes, the message is stored at block 408 in the Destination's partition which matches the integrity settings as previously defined. The message is then confirmed and acknowledged that it is stored at block 410. The Producer is notified, thereof.

If the response to decision block 406 is no, the process proceeds to block 412 where the message is sent to an Exception Destination. Each ME will have an Exception Destination (can also be referred as "Backout Queue" or DeadLetterQueue) defined to store messages of questionable validity. On unsuccessful attempt(s) to store the messages, the ME will treat such messages as invalid and move them into the Exception Destination where the message property is set to indicate the Integrity Failed. At block 414 the Producer application that is sending the messages is notified that the Destination is not enabled for the required integrity options. The process then proceeds to phase four as shown in FIG. 5.

Figure 5:
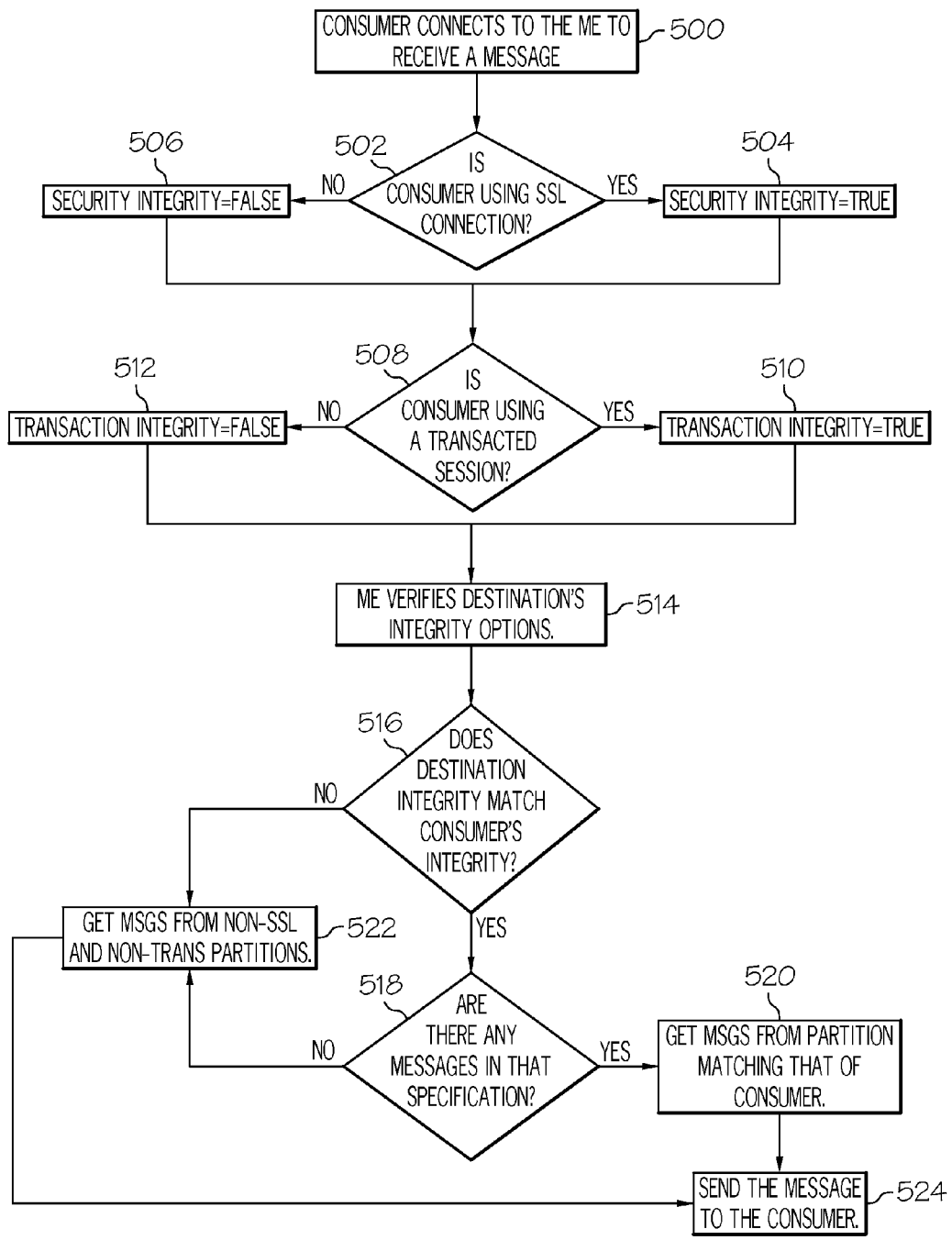
FIG. 5 illustrates phase four of an embodiment of the present invention.

Referring to FIG. 5, in the fourth phase the Consumer connects to the ME to receive a message at block 500. It is then determined at decision block 502 whether the Consumer is using an SSL connection. If the response to decision block 502 is yes, a Security Integrity flag is set as True at block 504.

If the response to decision block 502 is no, a Security Integrity flag is set as False at block 506.

After block 504 or block 506, it is determined at decision block 508 whether the Consumer is using a transacted session. If the response to decision block 508 is yes, a Transaction Integrity flag is set as True at block 510. If the response to decision block 508 is no, a Transaction Integrity flag is set as False at block 512.

After block 510 or block 512, the ME verifies the Destination's integrity options at block 514. It is determined at decision block 516, whether the Destination integrity matches the Consumer's integrity. As described above, a Destination can be set with a specific type of integrity option (Security, Transactional, both or neither). When a Consumer tries to access a particular message, the ME validates that the integrity option set on the Destination matches the Consumer's integrity (Consumer's integrity will be decided based on how the Consumer's session is created, if it is a Security Enabled (SSL) session, it carries Security integrity; if it is using a Transactional Context, it carries Transaction integrity; if it is both, it carries both Security and Transactional Integrity; or if it is neither, the Consumer carries no integrity option). The ME validates the Consumer integrity options with those set on the Destination. If the response to decision block 516 is yes, it is determined at decision block 518 if there are any messages matching that specification (in the appropriate Integrity partition). If the response to decision block 518 is yes, the process "gets" the messages from the corresponding integrity partition to deliver to the Consumer at block 520.

If the response to decision block 516 or decision block 518 is no, messages from the non-SSL and non-transacted partitions are obtained at block 522. Subsequent to block 520 or block 522, the appropriate messages are sent to the Consumer. Thus, in accordance with an embodiment of the present invention, only Consumers that have maintained the integrity desires of a Producer are allowed delivery of messages with matching integrity characteristics.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of preserving integrity of messages in a messaging oriented middleware system, comprising:
    determining a level of message integrity, as required by a message producer, by examination, with a processor at a messaging engine, of connection details between said message producer and said messaging engine, wherein said level of message integrity, as required by said message producer comprises a specified level of security integrity comprising a secure sockets layer protocol on or a secure sockets layer protocol off and a specified level of transaction integrity comprising committing a single unit of work message upon success and rolling said single unit of work message back if a failure occurs is on or committing a single unit of work message upon success and rolling said single unit of work message back if a failure occurs is off;
    storing said required level of message integrity, as required by said message producer, in a memory destination of said messaging engine;
    storing a single unit of work message sent from said message producer to said messaging engine in said memory destination under said required level of message integrity, as required by said message producer, at said messaging engine; and
    sending said single unit of work message from said memory destination under said required level of message integrity, as required by said message producer, to a consumer when said consumer connects to said messaging engine and it is determined, by said processor at said messaging engine, that said consumer conforms to said required level of message integrity, wherein said level of message integrity, as required by said message producer, is preserved without setting any message properties on said single unit of work message by said message producer or said message consumer.

2. The method of claim 1, further comprising creating a memory destination in said messaging engine with a logical partition for each combination of message integrity that can be required by said message producer.

3. The method of claim 1, wherein said determining a level of message integrity, as required by a message producer, by examination, with a processor, of connection details between said message producer and a messaging engine comprises checking a security integrity flag and a transaction integrity flag for true and false settings.

4. The method of claim 1, wherein storing said single unit of work message sent from said message producer to said messaging engine in said memory destination under said required level of message integrity further comprises said messaging engine validating said message against said level of message integrity, as required by said message producer, as previously stored in said memory destination of said messaging engine.

5. The method of claim 1, wherein when said memory destination at said messaging engine is not enabled to store said single unit of work message at said required level of message integrity, sending said single unit of work message to an exception destination.

6. The method of claim 5, further comprising sending an error message to said message producer.

7. A computer program product for preserving integrity of messages in a messaging oriented middleware system, the computer program product comprising a computer readable storage device having computer readable program code embodied therewith, the computer readable program code comprising:
    computer readable program code configured to determine a level of message integrity, as required by a message producer, by examination at a messaging engine of connection details between said message producer and said messaging engine, wherein said level of message integrity, as required by said message producer comprises a specified level of security integrity comprising a secure sockets layer protocol on or a secure sockets layer protocol off and a specified level of transaction integrity comprising committing a single unit of work message upon success and rolling said single unit of work message back if a failure occurs is on or committing a single unit of work message upon success and rolling said single unit of work message back if a failure occurs is off;

computer readable program code configured to store said required level of message integrity, as required by said message producer, in a memory destination of said messaging engine;

computer readable program code configured to store a single unit of work message sent from said message producer to said messaging engine in said memory destination under said required level of message integrity, as required by said message producer, at said messaging engine; and computer readable program code configured to send said single unit of work message from said memory destination under said required level of message integrity, as required by said message producer, to a consumer when said consumer connects to said messaging engine and it is determined, at said messaging engine, that said consumer conforms to said required level of message integrity, wherein said level of message integrity, as required by said message producer, is preserved without setting any message properties on said message by said message producer or said message consumer.

8. The computer program product of claim 7, further comprising computer readable program code configured to create a memory destination in said messaging engine with a logical partition for each combination of message integrity that can be required by said message producer.

9. The computer program product of claim 7, wherein said computer readable program code configured to determine a level of message integrity, as required by a message producer, by examination of connection details between said message producer and a messaging engine comprises computer readable program code configured to check a security integrity flag and a transaction integrity flag for true and false settings.

10. The computer program product of claim 7, wherein computer readable program code configured to store said single unit of work message sent from said message producer to said messaging engine in said memory destination under said required level of message integrity further comprises computer readable program code configured to validate said single unit of work message against said level of message integrity, as required by said message producer, as previously stored in said memory destination of said messaging engine.

11. The computer program product of claim 7, wherein when said memory destination at said messaging engine is not enabled to store said single unit of work message at said required level of message integrity, computer readable program code configured to send said single unit of work message to an exception destination.

12. The computer program product of claim 11, further comprising computer readable program code configured to send an error message to said message producer.

13. A system for preserving integrity of messages in a messaging oriented middleware system, comprising:

a processor; and memory connected to the processor, wherein the memory is encoded with instructions and wherein the instructions when executed comprise:

instructions for determining a level of message integrity, as required by a message producer, by examination at a messaging engine of connection details between said message producer and a messaging engine, wherein said level of message integrity, as required by said message producer comprises a specified level of security integrity comprising a secure sockets layer protocol on or a secure sockets layer protocol off and a specified level of transaction integrity comprising committing a single unit of work message upon success and rolling said single unit of work message back if a failure occurs is on or committing a single unit of work message upon success and rolling said single unit of work message back if a failure occurs is off;

instructions for storing said required level of message integrity, as required by said message producer, in a memory destination of said messaging engine;

instructions for storing a single unit of work message sent from said message producer to said messaging engine in said memory destination under said required level of message integrity, as required by said message producer, at said messaging engine; and instructions for sending said single unit of work message from said memory destination under said required level of message integrity, as required by said message producer, to a consumer when said consumer connects to said messaging engine and it is determined, at said messaging engine, that said consumer conforms to said required level of message integrity, wherein said level of message integrity, as required by said message producer, is preserved without setting any message properties on said single unit of work message by said message producer or said message consumer.

14. The system of claim 13, further comprising instructions for creating a memory destination in said messaging engine with a logical partition for each combination of message integrity that can be required by said message producer.

15. The system of claim 13, wherein said instructions for determining a level of message integrity, as required by a message producer, by examination of connection details between said message producer and a messaging engine comprises instructions for checking a security integrity flag and a transaction integrity flag for true and false settings.

16. The system of claim 13, wherein said instructions for storing said single unit of work message sent from said message producer to said messaging engine in said memory destination under said required level of message integrity further comprises instructions for validating said single unit of work message against said level of message integrity, as required by said message producer, as previously stored in said memory destination of said messaging engine.

17. The system of claim 13, wherein when said memory destination at said messaging engine is not enabled to store said single unit of work message at said required level of message integrity, instructions for sending said single unit of work message to an exception destination.

* * * * *